United States Patent [19]

McCray et al.

[11] Patent Number: 5,582,725
[45] Date of Patent: Dec. 10, 1996

[54] CHLORINE-RESISTANT COMPOSITE MEMBRANES WITH HIGH ORGANIC REJECTION

[75] Inventors: Scott B. McCray; Dwayne T. Friesen; Robert P. Barss, all of Bend; Leslie D. Nelson, The Dalles, all of Oreg.

[73] Assignee: Bend Research, Inc., Bend, Oreg.

[21] Appl. No.: 446,070

[22] Filed: May 19, 1995

[51] Int. Cl.$^6$ ..................................................... B01D 71/56
[52] U.S. Cl. ...................... 210/490; 210/500.38; 264/41
[58] Field of Search .................................. 210/490, 654, 210/500.38, 500.27; 264/41, 49; 427/244, 245, 246

[56] References Cited

U.S. PATENT DOCUMENTS

| | | |
|---|---|---|
| 4,259,183 | 3/1981 | Cadotte . |
| 4,277,344 | 7/1981 | Cadotte . |
| 4,529,646 | 7/1985 | Sundet . |
| 4,812,238 | 3/1989 | Cadotte et al. . |
| 4,960,517 | 10/1990 | Cadotte . |
| 4,960,518 | 10/1990 | Cadotte et al. . |
| 4,964,998 | 10/1990 | Cadotte et al. . |

*Primary Examiner*—Frank Spear
*Attorney, Agent, or Firm*—Chernoff, Vilhauer, McClung & Stenzel

[57] ABSTRACT

A method for making a chlorine-resistant composite polyamide membrane having high organic rejection, the essential step of which comprises treating a conventional composite membrane with an acyl halide. The novel membrane is especially suitable for the treatment of water containing chlorine or lower molecular weight organic compounds.

25 Claims, No Drawings

CHLORINE-RESISTANT COMPOSITE MEMBRANES WITH HIGH ORGANIC REJECTION

The government has certain nonexclusive rights in this invention, which was made with government support under Contract Nos. NAS9-18477, DE-FG03-92ER81422, and N00167-88-C-0023 awarded by NASA, the Department of Energy, and the Department of the Navy, respectively.

BACKGROUND OF THE INVENTION

Composite polyamide reverse-osmosis (RO) membranes are known. See, for example, U.S. Pat. Nos. 4,259,183, 4,529,646, and 4,277,344. The treatment of such membranes to increase rejection has been described, for example, in U.S. Pat. No. 4,960,517, which discloses a process whereby a cross-linked polyamide RO membrane is treated with a solution of an amine-reactive reagent group such as the sodium salt of chloracetic acid, a carboxylic acid anhydride, a carboxylic acid ester, a 1,3-heterocyclic sultone, and an amine-reactive ethylenically unsaturated compound such as acrylic acid. The resulting membrane has an improved rejection for solutes such as NaCl, $NaNO_3$, $H_2SO_4$, NaOH, and isopropyl alcohol (IPA). U.S. Pat. No. 4,960,518 describes a method of treating a polyamide RO membrane with an oxidizing agent such as peroxycarboxylic acid, periodic acid, chloramine compounds, and N-bromoamine to improve its rejection of sulfuric acid and IPA. U.S. Pat. No. 4,964,998 describes a process for separating water from organics such as IPA wherein the permselective layer of the RO membrane is a cross-linked polyamide that has been treated with an amine-reactive reagent such as sultone or nitrous acid. Because such membranes are often used in the treatment of chlorinated water, there has been a general recognition in the art of a need for such membranes to have a high resistance to attack by chlorine. Various methods have been proposed to improve the chlorine resistance of composite RO membranes. See, for example, U.S. Pat. No. 4,812,238.

Thus, although the prior art has utilized various treatments of polyamide RO membranes to improve their chlorine-resistance and their rejection of organics, there has been no recognition of the use of an acyl halide treatment to so improve such membranes. There is therefore a need in the art for membranes capable of simple fabrication that have high rejections for organic compounds and improved chlorine resistance.

SUMMARY OF THE INVENTION

The present invention lies in the discovery that a high rejection, chlorine-resistant membrane can be obtained by treating a conventional composite polyamide RO membrane with an acyl halide, resulting in the production of a membrane having significant increases in chlorine-resistance and in the rejection of low molecular weight organics. In a most preferred embodiment, fabrication of such a novel composite membrane comprises the steps of (a) forming a polyamide composite membrane, (b) swelling the membrane, (c) drying the swollen membrane and (d) contacting the dried swollen membrane with a solution of an acyl halide. Excellent chlorine-resistance and a modest improvement in organics rejection may also be obtained by omitting steps (b) and (c).

DETAILED DESCRIPTION OF THE INVENTION

The preparation of composite polyamide RO membranes is well-known. In the present invention, it is preferred that the polyamide membrane be a multilayered composite membrane having a polyamide selective layer made by interfacial polymerization. Accordingly, the polyamide membrane is preferably formed by reacting reactants comprising (1) a compound bearing at least two amine groups and (2) a compound bearing at least two acyl halide groups, whereby the amine and acyl halide groups react to form the polyamide Examples of the preparation of such membranes are given in U.S. Pat. Nos. 4,277,344, 4,853,122, 4,978,455, and 4,876,009, the disclosures of which are incorporated herein by reference. It is especially preferred that the polyamide membrane be made by reaction of an aromatic diamine with a trifunctional acyl halide, such as is disclosed in U.S. Pat. Nos. 4,277,344, 4,828,708, 4,872,984, and 4,830,885, the disclosures of which are incorporated herein by reference.

The membrane support layer (as opposed to the selective layer) that provides mechanical strength to the composite should give as little resistance to the transport of the permeating species through the selective layer as is technically feasible. Additionally, the membrane support should be chemically resistant, allowing for operation on feed streams containing various chemical constituents. Materials suitable for the membrane support include, but are not limited to, organic polymers such as polypropylene, polyacrylonitrile, poly(vinylidenefluorides), poly(etherimides), polyimides, polysulfones, poly(ethersulfones), poly(arylsulfones), poly(phenylquinoxalines), polybenzimidazoles, and copolymers and blends of these materials; and inorganic materials such as porous glass, carbon, ceramics, and metals.

The material used to swell the composite polyamide membrane is preferably an aqueous solution. A swelling solution comprising merely water is sufficient for the treatment process to improve the organic rejection characteristics of the membrane, and so mere use of the composite polyamide membrane for RO treatment of water, followed by drying, will suffice. In a preferred embodiment, additives are added to the swelling solution to enhance the swelling treatment. Examples of such additives include a surfactant; alcohols such as methanol, ethanol, ethylene glycol, phenol, cresols, and glycerol; amines such as triethylamine (TEA), monoethanol amine (MEA), and diethanol amine (DEA); amides such as dimethylacetamide (DMAC), dimethylformamide (DMF), and formamide (FA); pyrrolidinones such as N-methylpyrrolidinone (NMP); ketones such as acetone, methylethyl ketone (MEK), and methyl-isobutyl ketone (MIBK); esters, such as ethyl acetate; and organic acids such as acetic acid and formic acid. The surfactant selected may be anionic, cationic, nonionic, or amphoteric. Especially preferred is the surfactant sodium lauryl sulfate (SLS). The concentration of surfactant used can range from 1 to 10,000 ppm or, more preferably, 100 to 5000 ppm. The swelling solution may also contain an acid scavenger or base. Examples include sodium hydroxide, triethylamine (TEA), and sodium carbonate. TEA is especially preferred. The concentration of acid scavenger used may range from 10 to 10,000 ppm or, more preferably, 100 to 1000 ppm.

It has been found that the length of swelling time is particularly important in obtaining treated membranes with high fluxes. Generally, the swelling time must be greater than one-half hour for the treatment to be effective. However, longer swelling times, from 24 to 48 hours, result in membranes with higher fluxes, without any consequential loss in organic rejection.

Once the membrane has been swollen, it is dried. Drying may be accomplished by simply exposing the membrane to the atmosphere, or by directing a stream of dry gas past the membrane surface. Generally, the drying time should be less than about 30 minutes.

The swollen, dried composite polyamide membrane is then contacted with a solution of an acyl halide in a water-immiscible solvent. The acyl halide is preferably monofunctional in the sense that it has only one acyl halide group. Exemplary acyl halides include benzoyl chloride, acetyl chloride, furoyl chloride, napthoyl chloride, nitrobenzoyl chloride, pipernylic acid chloride, coumalic acid chloride, and 5-oxo-2-tetrahydrofuran carboxylic acid chloride. The concentration of acyl halide used in the treatment solution may be between 0.01 and 10 wt %, but is most preferably between 0.5 and 2 wt %. Any water-immiscible liquid may be used as the solvent for the acyl halide, provided it does not react with the acyl halide or the polyamide RO membrane, and provided the acyl halide dissolves to the desired concentration in the solvent. Exemplary solvents include hexane, heptane, dodecane, petroleum distillates, napthas, chlorinated hydrocarbons, freons, and aromatics. The length of acyl halide treatment is also important in determining the final performance of the treated membrane. Treatment time may range from 5 seconds to 30 minutes, with 30 to 60 seconds being preferred. Following the acyl halide treatment, the membrane may be dried a second time. The second drying step may also be accomplished by simply exposing the membrane to the atmosphere, or by directing a stream of dry gas past the membrane surface. Generally, the second drying step should be conducted for less than about 30 minutes. Following the second drying time, the membrane may be rinsed in an appropriate rinse solution such as water.

Although the most preferred embodiment of the present invention includes the swelling and drying steps prior to acyl halide treatment, improved chlorine-resistance and modest entrancement of organics rejection are also obtained when the swelling and drying steps are omitted.

The so-fabricated membrane may be used in the form of a flat sheet, a hollow fiber or a tube. All of the above treatment process steps may be performed either before or after the membrane is placed into a module. The resulting treated membrane exhibits an improved rejection for organic compounds relative to that of the untreated membrane, allowing the treated membrane to produce a significantly "cleaner" permeate, and reducing or eliminating the need for a second RO membrane separation to further purify the permeate from the first RO membrane. The resulting treated membrane also has an improved resistance to chlorinated feed solutions. Specifically, when exposed to a chlorinated feed, the water flux does not decline as severely as it does for an untreated membrane. The treated membrane will therefore find considerable application for the treatment of waste-waters containing either chlorine or low molecular weight organics or both.

EXAMPLE 1

A commercially available flat sheet composite polyamide membrane ("FT-30" from FilmTec Corp. of Minneapolis, Minn.) was swollen in an aqueous solution of 500 ppm TEA for 30 minutes. After blotting excess solution from the membrane surface, the swollen membrane was allowed to air-dry for 10 minutes. The swollen, dried membrane was then treated for 10 minutes in a solution of 1 wt % benzoyl chloride in hexane. The membrane was then rinsed in water for 5 minutes and allowed to air-dry for 2 hours. The resulting membrane was then tested for organic passage (100% minus % organic rejection) in an RO test using a feed solution containing 100 ppm of the organic benzyl alcohol in water at 55 atm, 25° C., and pH 6. The so-treated membrane exhibited a rejection for benzyl alcohol of 90% corresponding to a benzyl alcohol passage of 10%, and had a water flux of 25 $L/m^2$-hr.

COMPARATIVE EXAMPLE 1

An untreated FT-30 membrane was operated on an identical feed solution and under identical conditions as in Example 1. This membrane exhibited a benzyl alcohol passage of 20%, and had a water flux of 50 $L/m^2$-hr. Thus, the benzyl alcohol passage in the membrane was twice that of the treated membrane of Example 1.

EXAMPLES 2 to 6

The treated FT-b 30membrane of Example 1 was tested on feed solutions containing 100 ppm of various organic solutes and compared with tests of the same feed solutions by untreated FT-30 membranes. The results of these tests are presented in Table 1. These data show that the organic rejection of the treated membrane was significantly higher than that of the untreated membrane.

EXAMPLE 7

A sample of the commercially available FT-30 membrane was swollen in an aqueous solution of 500 ppm TEA and 1000 ppm sodium lauryl sulfate (SLS) in water for 48 hours. After blotting excess solution from the membrane surface, the swollen membrane was allowed to air-dry for 10 minutes. The swollen, dried membrane was then treated for 30 seconds in a solution of 1 wt % furoyl chloride in hexane. The membrane was again allowed to air-dry for 10 minutes prior to rinsing in water. The resulting membrane was then tested in an RO test using a feed solution of 100 ppm phenol in water at 55 atm, 25° C., and pH 6. The same membrane, untreated, was used on the same feed under the same conditions and the results are shown in Table 1. As is apparent from Table 1, the phenol passage rate through the treated membrane (2%) was reduced by a factor of 3.5, when compared to that for the untreated membrane (7%).

EXAMPLES 8 to 10

The treated membrane of Example 7 was tested in the same manner as in Example 7 on feed solutions containing 100 ppm of various solutes. The results of these tests are also presented in Table 1, along with the results of treatment of the same feeds under identical conditions by untreated FT-30 membranes.

TABLE 1

| Ex. | | Organic Rejection | | Water Flux* Treated/ |
|---|---|---|---|---|
| No. | Organic | Treated | Untreated | Untreated |
| 2 | benzaldehyde | 95% | 89% | 25/50 |
| 3 | ethanol | 80% | 60% | " |
| 4 | 2-butoxyethanol | 96% | 93% | " |
| 5 | cresol | 96% | 89% | " |
| 6 | urea | 98% | 60% | " |
| 7 | phenol | 98% | 93% | 25/55 |
| 8 | IPA | 96% | 82% | " |

TABLE 1-continued

| Ex. No. | Organic | Organic Rejection Treated | Organic Rejection Untreated | Water Flux* Treated/ Untreated |
|---|---|---|---|---|
| 9 | MEK | 96% | 91% | " |
| 10 | TCE | 73% | 68% | " |

*in units of L/m$^2$-hr

EXAMPLES 11 to 13

Samples of the commercially available FT-30 membrane were swollen in a solution of 1000 ppm TEA and 100 ppm SLS in water for times ranging from 30 minutes to 48 hours. After blotting excess solution from the membrane surface, the swollen membrane was allowed to air-dry for 10 minutes. The swollen, dried membrane was then treated for 10 minutes in a solution of 1 wt % furoyl chloride in hexane. The membrane was again allowed to air-dry for 10 minutes prior to rinsing in water. The resulting treated membranes were then tested in an RO test using a feed solution of 100 ppm of the organic phenol in water at 55 atm, 25° C., and pH 6. The results of these tests, presented in Table 2, indicate that longer swelling times result in higher phenol rejections and higher water fluxes.

TABLE 2

| Example No. | Swelling Time (hr) | Phenol Rejection | Water Flux* |
|---|---|---|---|
| 11 | 0.5 | 94% | 14 |
| 12 | 22 | 97% | 28 |
| 13 | 48 | 97% | 25 |

*in units of L/m$^2$-hr

EXAMPLES 14 to 17

Samples of the commercially available FT-30 membrane were swollen in an aqueous solution of 1000 ppm TEA and 100 ppm SLS in water for 22 hours. After blotting excess solution from the membrane surface, the swollen membrane was allowed to air-dry for times ranging from 0 to 30 minutes. The swollen, dried membrane was then treated for 2 minutes in a solution of 1 wt % furoyl chloride in hexane. The membrane was again allowed to air-dry for 10 minutes, prior to rinsing in water. The resulting treated membranes were then tested in an RO test using a feed solution of 100 ppm phenol in water at 55 atm, 25° C., and pH 6. The results of these tests, presented in Table 3, indicate that shorter air-dry times lead to higher water fluxes with substantially the same improvement in the rate of phenol rejection.

TABLE 3

| Example No. | First Dry Time (min) | Phenol Rejection | Water Flux* |
|---|---|---|---|
| 14 | 0 | 97% | 39 |
| 15 | 2 | 96% | 34 |
| 16 | 10 | 97% | 28 |
| 17 | 30 | 97% | 26 |

*in units of L/m$^2$-hr

EXAMPLES 18 to 21

Treated membranes were prepared using the same procedures outlined in Examples 14 to 17, except that the first air-dry time was set at 10 minutes and the concentration of furoyl chloride was varied from 0.5 to 2 wt %. The resulting membranes were then tested in an RO test using a feed solution of 100 ppm phenol in water at 55 atm, 25° C., and pH 6. The results of these tests, presented in Table 4, indicate that lower acyl halide concentrations lead to higher water fluxes with no change in the high rate of phenol rejection.

TABLE 4

| Example No. | Acid Chloride Conc. (wt %) | Phenol Rejection | Water Flux* |
|---|---|---|---|
| 18 | 0.5 | 97% | 34 |
| 19 | 1.0 | 97% | 35 |
| 20 | 1.5 | 97% | 23 |
| 21 | 2.0 | 97% | 28 |

*in units of L/m$^2$-hr

EXAMPLES 22 to 25

Treated membranes were prepared using the same procedures outlined in Examples 14 to 17, except that the swelling time was set at 48 hours, the first air-dry time was set at 10 minutes and the acyl halide treatment time was varied from 0.5 to 30 minutes. The resulting membranes were then tested in an RO test using a feed solution of 100 ppm phenol in water at 55 atm, 25° C., and pH 6. The results of these tests, presented in Table 5, indicate that shorter acyl halide treatment times lead to higher water fluxes with substantially no change in the high rate of phenol rejection.

TABLE 5

| Example No. | Treatment Time (min) | Phenol Rejection | Water Flux* |
|---|---|---|---|
| 22 | 0.5 | 98% | 25 |
| 23 | 2 | 97% | 25 |
| 24 | 10 | 97% | 23 |
| 25 | 30 | 97% | 18 |

*in units of L/m$^2$-hr

EXAMPLE 26

A composite polyamide membrane was prepared by interfacial polymerization of isophthaloyl chloride and tri-tetrakis(aminomethyl)methane [(NH$_2$CH$_2$)$_3$-C-O-C(CH$_2$NH$_2$)$_2$-O-C(CH$_2$NH$_2$)$_3$] on the surface of a microporous polysulfone support. This membrane was swelled by immersing in water for 10 minutes, and then air-dried overnight. The membrane was then treated for 30 seconds with a solution of 0.5 wt % oxalyl chloride in hexane. The treated membrane was then rinsed in hexane and allowed to again air-dry overnight prior to evaluating in an RO test. The resulting treated membrane had a water flux of 39 L/m$^2$-hr in the RO test. This same membrane was then tested on a feed solution containing 20 ppm chlorine. After one hour of operation, the water flux was 32 L/m$^2$-hr, representing a water flux decline of 17%.

For comparison, an untreated membrane of the same composition suffered a 73% loss in flux after exposure to a second feed stream containing one-half the chlorine concentration (10 ppm) for 1 hour, demonstrating that the post-treatment technique of the present invention substantially improves the chlorine-resistance of the composite membrane.

The terms and expressions employed in the foregoing specification are used therein as terms of description and not of limitation, and there is no intention, in the use of such terms and expressions, of excluding equivalents of the features shown and described or portions thereof, it being recognized that the scope of the invention is defined and limited only by the claims which follow.

What is claimed is:

1. A method of making a composite membrane, comprising the steps of:

(a) forming a composite polyamide membrane comprising a support and a polyamide permselective layer;

(b) forming a swollen membrane by swelling said membrane with a swelling solution;

(c) drying said swollen membrane; and (d) treating said membrane of step (c) with a solution of an acyl halide in a water-immiscible solvent.

2. The method of claim 1 wherein said membrane of step (a) is made by interfacial polymerization.

3. The method of claim 2 wherein said membrane of step (a) is the reaction product of meta-phenylenediamine and trimesoyl chloride.

4. The method of claim 1 wherein said swelling solution of step (b) comprises water.

5. The method of claim 4 wherein said swelling solution of step (b) contains an additive selected from alcohols, amines, amides, pyrrolidinones, ketones, esters, and organic acids.

6. The method of claim 4 wherein said swelling solution of step (b) contains a surfactant.

7. The method of claim 6 wherein said surfactant is sodium lauryl sulfate.

8. The method of claim 4 wherein said swelling solution of step (b) contains a scavenger selected from an acid scavenger and a base.

9. The method of claim 8 wherein said scavenger is triethylamine.

10. The method of claim 4 wherein said swelling solution of step (b) comprises 1000 ppm sodium lauryl sulfate and 500 ppm triethylamine in water.

11. The method of claim 1 wherein step (b) is conducted for at least one-half hour.

12. The method of claim 11 wherein step (b) is conducted for at least 24 hours.

13. The method of claim 1 wherein step (c) is conducted for no more than 30 minutes.

14. The method of claim 13 wherein step (c) is conducted for about 10 minutes.

15. The method of claim 1 wherein said acyl halide of step (d) is selected from benzoyl chloride, acetyl chloride, furoyl chloride, napthoyl chloride, nitrobenzoyl chloride, pipernylic acid chloride, coumalic acid chloride, and 5-oxo-2-tetrahydrofuran carboxylic acid chloride.

16. The method of claim 1 wherein the concentration of said acyl halide of step (d) ranges from 0.1 to 2 wt %.

17. The method of claim 1 wherein said water-immiscible solvent of step (d) comprises a solvent selected from hexane, heptane, dodecane, petroleum distillates, napthas, chlorinated hydrocarbons, freons, and aromatic solvents.

18. The method of claim 1 wherein step (d) is conducted for 0.1 to 30 minutes.

19. The method of claim 18 wherein step (d) is conducted for 0.5 to 1 minute.

20. The method of claim 1, including an additional step (e) comprising drying said treated membrane of step (d).

21. The method of claim 20 wherein step (e) is conducted for less than 30 minutes.

22. The method of claim 1 or 20, including an additional step (f) comprising rinsing said treated membrane of step (d).

23. The method of claim 22 wherein step (f) is conducted in water.

24. The method of claim 1 wherein said membrane of step (a) is in a form selected from a flat sheet, a hollow fiber and a tube.

25. The product of the method of claim 1.

* * * * *

UNITED STATES PATENT AND TRADEMARK OFFICE
CERTIFICATE OF CORRECTION

PATENT NO. : 5,582,725

DATED : December 10, 1996

INVENTOR(S) : McCray, Friesen, Barss and Nelson

It is certified that error appears in the above-indentified patent and that said Letters Patent is hereby corrected as shown below:

Col. 2, line 13: after polyamide insert (.)

Col. 4, line 21: delete " FT-b30" insert -- FT-30 --

Signed and Sealed this

Sixteenth Day of September, 1997

Attest:

BRUCE LEHMAN

Attesting Officer

Commissioner of Patents and Trademarks